United States Patent
Felts (10) Patent No.: US 10,073,706 B2
(45) Date of Patent: Sep. 11, 2018

(54) METHOD AND SYSTEM FOR PERFORMING APPLICATION SERVER CONFIGURATION USING CONFIGURATION GROUPS

(75) Inventor: David L. Felts, Denville, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 679 days.

(21) Appl. No.: 12/824,004

(22) Filed: Jun. 25, 2010

(65) Prior Publication Data

US 2011/0320574 A1 Dec. 29, 2011

(51) Int. Cl.
 *G06F 9/445* (2018.01)

(52) U.S. Cl.
 CPC ................ *G06F 9/44505* (2013.01)

(58) Field of Classification Search
 CPC .................................... G06F 9/44505
 USPC ...................................... 709/220
 See application file for complete search history.

(56) References Cited

U.S. PATENT DOCUMENTS

| | | | |
|---|---|---|---|
| 6,697,805 B1 | 2/2004 | Choquier et al. | |
| 7,072,807 B2 | 7/2006 | Brown et al. | |
| 7,703,005 B2 | 4/2010 | Felts | |
| 2005/0021688 A1* | 1/2005 | Felts et al. | 709/220 |
| 2006/0080413 A1* | 4/2006 | Oprea et al. | 709/220 |
| 2006/0242183 A1 | 10/2006 | Niyogi et al. | |
| 2007/0112847 A1 | 5/2007 | Dublish et al. | |
| 2011/0296021 A1* | 12/2011 | Dorai et al. | 709/226 |

OTHER PUBLICATIONS

Reductive Labs, "Puppet", Feb. 21, 2009, 2 pages url: http://reductivelabs.com/products/puppet/.
Dare Obasanjo aka Carnage4Life, "Managing Large Web Server Farms: Puppet", Aug. 28, 2008, 3 pages url: http://www.25hoursaday.com/weblog/2008/08/11/ManagingLargeWebServerFarmsPuppet.aspx.
Jing Luo et al., "Declarative Constraint Framework for SOA Deployment and Configuration", IEEE International Conference on Web Services, 2008, 8 pages.
Alan Dearle et al., A Framework for Constraint-Based Deployment and Autonomic Management of Distributed Applications (Extended Abstract), IEEE, Proceedings of the International Conference on Autonomic Computing (ICAC'04), 2004, 2 pages.
Jeff Prosise, "Remoting Basics", Chapter 15, Programming Microsoft. NET, Microsoft Press, 2002, 16 pages url: http://icodeguru.com/dotnet/Programming-Microsoft.NET/netcorehtml/32ch18b.htm.
Paul Anderson, "The Complete Guide to LCFG", Revision 0.99.63, Jun. 1, 2005, 319 pages.
Desai et al., "Bcfg2 Manual" Sep. 2005, Argonne National Laboratory, 25 pages.

(Continued)

Primary Examiner — Suraj Joshi
(74) Attorney, Agent, or Firm — Invoke (57) ABSTRACT

Disclosed is an approach for using a declarative model to configure domains, where the declarative model allows definition of applications and services within groups, definition of topology units in groups and a mapping between the application and service groups and topology groups. Processing of this model, embodied in XML, involves automatically changing the application server configuration to reflect the association of applications and services to the topology units, enabling the application server to deploy applications and services to servers, clusters, and other elements upon boot-up of the components.

28 Claims, 9 Drawing Sheets (56) References Cited

OTHER PUBLICATIONS

CFengine, "Examples", Apr. 6, 2009, 3 pages url: http://www.cfengine.com/pages/examples.
SmartFrog, "SmartFrog Home", May 23, 2009, 3 pages url: http://wiki.smartfrog.org/wiki/display/sf/SmartFrog+Home.
ControlTier, Inc. et al., "Web Ops 2.0: Achieving Fully Automated Provisioning", Version 1.1, Apr. 24, 2009, 10 pages.

* cited by examiner

```
<config-groups>
  <app-svc-groups>
    <group name="jrf-all-apps"/>
      <app-deployment name="jrf-app1"/>
    </group>
    <group name="jrf-admin-apps"/>
      <app-deployment name="jrf-app2"/>
    </group>
  </app-svc-groups>
  <domain-topology>
    <server-group name="jrf-admin-svr" admin-server="true"/>
    <app-svc-group-mapping>
      <app-svc-group>jrf-admin-apps</app-svc-group>
      <target-server-group>jrf-admin-svr</target-server-group>
    </app-svc-group-mapping>
  </domain-topology>
</config-groups>
```

Figure 7

```
<config-groups>
  <app-svc-groups>
    <group name="ums-main-apps "/>
      <app-deployment name="sdpmessagingserver"/>
      <app-deployment name=" sdpmessagingdriver-email"/>
    </group>
  </app-svc-groups>
</config-groups>
```

Figure 8

```xml
<config-groups>
    <app-svc-groups>
        <group name="soa-main-apps "/>
            <app-deployment name=" soa-app1"/>
        </group>
    </app-svc-groups>
    <domain-topology>
        <server-group name="soa-main-svrs">
            <server-prefix>soa</server-prefix>
        </server-group>
        <app-svc-group-mapping>
            <app-svc-group>jrf-all-apps</app-svc-group>
            <target-server-group>soa-main-svrs</target-server-group>
        </app-svc-group-mapping>
        <app-svc-group-mapping>
            <app-svc-group>ums-main-apps</app-svc-group>
            <target-server-group>soa-main-svrs</target-server-group>
        </app-svc-group-mapping>
        <app-svc-group-mapping>
            <app-svc-group>soa-main-apps</app-svc-group>
            <target-server-group>soa-main-svrs</target-server-group>
        </app-svc-group-mapping>
        <app-svc-group-mapping>
            <app-svc-group>soa-main-apps</app-svc-group>
            <target-server-group>soa-main-svrs</target-server-group>
        </app-svc-group-mapping>
    </domain-topology>
</config-groups>
```

FIG. 9

METHOD AND SYSTEM FOR PERFORMING APPLICATION SERVER CONFIGURATION USING CONFIGURATION GROUPS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The invention relates to the field of application server configuration.

BACKGROUND AND SUMMARY

Application servers constitute a fast-growing and important field in the computing industry. As web applications and other distributed applications have evolved into large-scale applications that demand more sophisticated computing services, specialized application servers have been developed to provide a platform supporting these large-scale applications. Applications that run on application servers are generally constructed according to an N-tier architecture, in which, for example, presentation, business logic, and data access layers are kept separate.

The application server space is sometimes referred to as "middleware", since application servers are often responsible for deploying and running the business logic layer and for integrating, and interacting with, various enterprise-wide resources, such as web servers, databases, and backend or legacy systems. Middleware typically comprises connectivity software that includes a set of enabling services that allow multiple processes running on one or more machines to interact with each other. The middleware functions as a programming abstraction and infrastructure for integration. Middleware services include sets of distributed software that exist between the application, the operating system, and network services on a system node in the network, including, for example, remote procedure calls, message oriented middleware, and object request brokers.

Application servers typically provide application services for tasks that are commonly needed by, for example, web applications and other networked applications. Application servers often incorporate these services and components into an integrated platform specialized for creating web applications. The platform may leverage various standard software component models, such as the Common Object Request Broker Architecture (CORBA), the (Distributed) Component Object Model (COM/DCOM), Enterprise JavaBeans (EJB), etc., or the platform may provide its own software component model or may extend standard component models.

In the middleware/application server stack, there are numerous products, components, and objects that need to be configured to work with one another. For example, within the context of an application server, applications and services must be associated with units of a topology that provide a runtime environment for execution. Such applications include runnable units of functionally related code and services including instances of well known interfaces exposed by standard subsystems, such as JDBC (Java Database Connectivity) and JMS (Java Message Service). A server, e.g., an instance of a specialized Java Virtual Machine, or a cluster, e.g., a set of cooperating servers, are examples of topology units.

The association between applications, services, and topology units is normally achieved by point to point targeting of a given application or service to a topology unit, by targeting a specific application or service to a specific named server. Conventionally, this process is very labor intensive and must be performed manually for each configuration, or by using generic scripts that must also be manually customized to address the specific configuration issues. Given the complexity of modern configurations, these conventional approaches are typically very lengthy and prone to errors. These problems are further amplified by modern environments that often require multiple components to be configured separately, which must nonetheless share applications and other resources.

Therefore, there is a need for an improved approach to configure the associations between applications, services, and topology units. Embodiments of the present invention provide an approach that uses a declarative model, where the declarative model allows definition of applications and services within groups, definition of topology units in groups and a mapping between the application and service groups and topology groups. Processing of this model, embodied in XML, involves automatically changing the application server configuration to reflect the association of applications and services to the topology units, enabling the application server to deploy applications and services to servers, clusters, and other elements upon boot-up of the components. The declarative model is designed for extensibility to provide an application server neutral paradigm, allowing automated targeting or scoping of applications and services to topology units supported by a given application server.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

The present invention is directed to an improved approach to configure associations between applications, services, and topology units for application servers. Embodiments of the present invention provide an approach that uses a declarative model, where the declarative model allows definitions of aplications and services within groups, definition of topology units in groups and a mapping between the application and service groups and topology groups. Processing of this model, embodied in XML, involves automatically changing the application server configuration to reflect the association of applications and services to the topology units, enabling the application server to deploy applications and services to servers, clusters, and other elements upon boot-up of the components. The declarative model is designed for extensibility to provide an application server neutral paradigm, allowing automated targeting or scoping of applications and services to topology units supported by a given application server.

Figure 1:
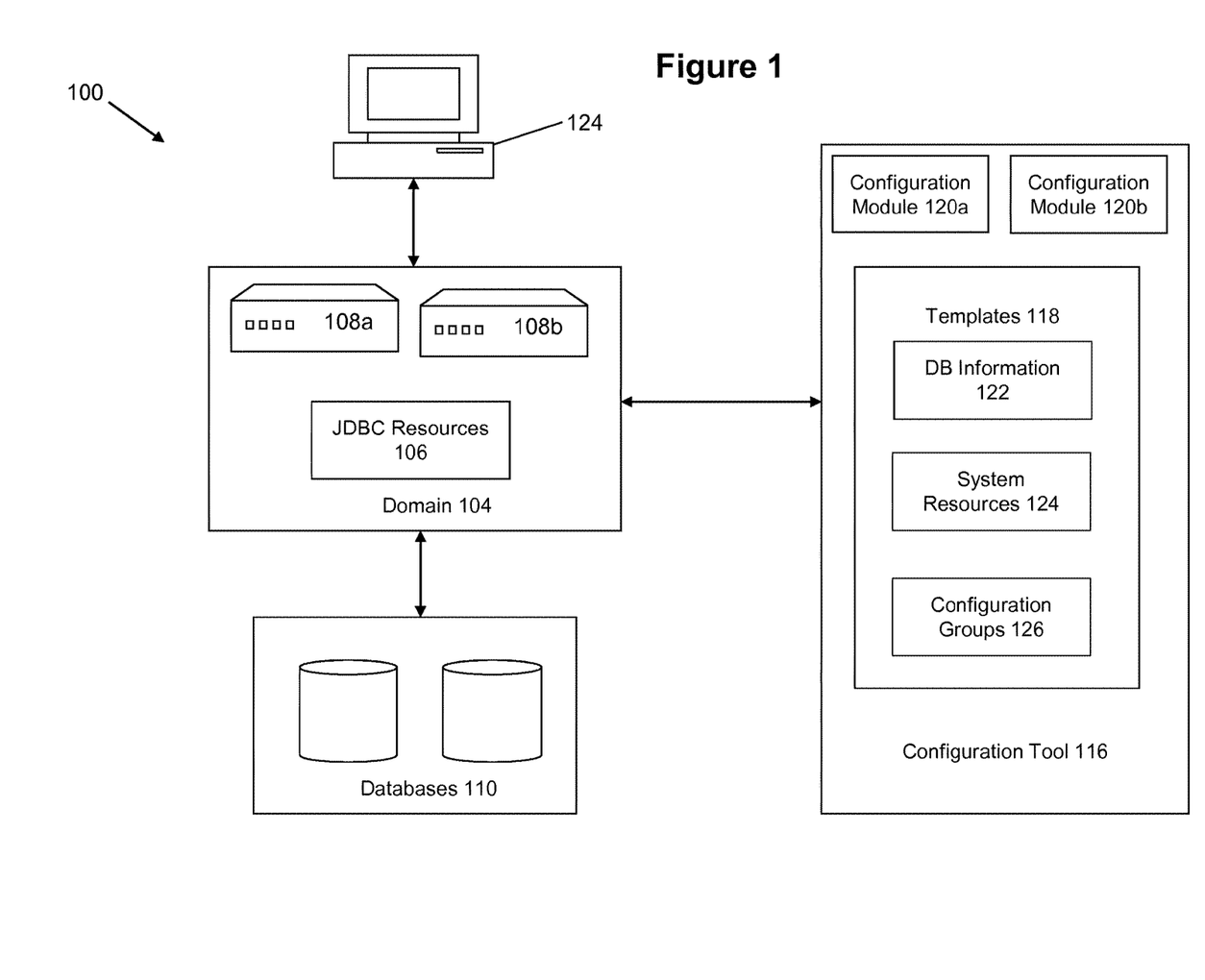
FIG. 1 illustrates an example system according to an embodiment of the invention.

FIG. 1 illustrates a system 100 for using declarative models to provide associations between applications, services, and topology units for application servers. The topology units may be embodied into one or more domains 104, which are basic administration units for application servers and which may include, for example, web/application server(s), portal(s), business-to-business integration products, interactive development tool(s), and enterprise applications, which are shown in FIG. 1 as 108a-b and collectively referred to as "applications".

The domain 104 may also include application artifacts that are associated with the applications, such as libraries or services (hereinafter referred to collectively as "services"). For example, JDBC resources 106 is a type of application artifact that allows applications to communicate with a backend database 110.

As previously noted, a domain is the basic administration unit for a web/application server, and includes one or more server instances and logically related resources and services that are managed, collectively, as a unit. Therefore, the basic domain infrastructure includes at least one administration server and optional managed servers. The administration server provides a central point for managing the domain and providing access to the web/application server administration tools, such as the configuration tool 116 described in more detail below. The managed servers can host application components and resources, which are also deployed and managed as part of the domain.

A domain may also include web/application server clusters, which are groups of server instances that work together to provide scalability and high availability for applications. Clusters can improve performance and provide fail-over should a server instance become unavailable. The servers within a cluster can run on the same machine, or they can reside on different machines. To a client, a cluster appears as a single web/application server instance.

In addition to infrastructure components, a domain can define the basic network configuration for the server instances it contains. Specifically, a domain can define application deployments, supported application services (such as database and messaging services), security options, and physical host machines.

A user may also find it useful to configure multiple domains based on specific criteria, such as system administrator responsibilities, the logical classification of applications, the geographical locations of servers, or size.

To configure the domain 104, the various applications and services must be properly defined and associated with the appropriate topology units in the system 100. In one embodiment, domain creation and configuration is controlled by a configuration tool 116 that employs one or more templates 118. The configuration tool 116 uses one or more configuration modules, which are shown in FIG. 1 as 120a-b, to create, extend and update one or more domains 104.

The configuration modules 120a and 120b use one or more templates 118 that contain the attributes and files required for building or extending a particular domain. The template comprises a set of artifacts and a set of metadata relating to the domains. The templates 118 can contain domain, application and service configuration parameters along with supporting files. In one embodiment, the types of templates used by the configuration tool 116 can include a "domain" template for building a domain and "extension" templates for extending a domain. The domain template can define the full set of resources within a domain, including infrastructure components, applications, services, security options, and general environment and operating system options. This type of template is used to create a domain. An extension template can define applications and services, such as JDBC (Java Database Connectivity) or JMS (Java Message Service) components, and startup/shutdown classes that can be used to extend an existing domain. Templates include definitions embodied in XML or other metadata files that describe JDBC, JMS, and other service-related information. For example, Templates 118 may include DB Information 122 comprising metadata relating to database grouping, test and filtering information, and System Resources 124 comprising metadata relating to system resources, such as a JDBC or JMS system resource. A generalized approach for using templates to configure domains is described in U.S. Patent Publication 2005/0021688, published on Jan. 27, 2005, which is hereby incorporated by reference in its entirety.

The following are examples of types or classes of applications/services that may be defined in templates: (1) capacity; (2) context request class; (3) custom-resource; (4) fair-share-request-class; (5) file-store; (6) library; (7) startup class; (8) mail-session; (9) max-threads-constraint; (10) min-threads-constraint; (11) remote-safe-context; (12) response-time-request-class; (13) saf-agent (start on store and forward); (14) work-manager; (15) ws-reliable-delivery-policy (ws refers to "web service"); (16) shutdown-class; (17) library; (18) application; (19) customService; (20) connectionFactory; (21) queueConnectionFactory; (22) topicConnectionFactory; (23) queue; (24) activationSpec; (25) datasource; (26) URL Provider; (27) workManager; (28) busMember; and/or (29) resourceAdapter.

The present embodiment comprises one or more templates 118 that include definitions corresponding to Configuration Groups 126 that are embodied in the templates. The templates comprise a configuration groups model that contains definitions of applications, services, servers, clusters and mappings that express affinities among these entities. The model enables the ability to define homogeneous sets of applications and services on a single server, group of servers or cluster. Together with automated targeting logic in the configuration framework, the configuration groups model can enable movement of functionally related applications and services as a single operation when transitioning from one topology to another, e.g. single server to multiple servers or single server to cluster. This simplifies and reduces risk when performing domain configuration.

The use of configuration groups enables simple and complex targeting of applications and services to servers and clusters (infrastructure entities). The embodiments described herein can be used to implement modular templates with dependency relationships that can be applied together during domain creation or as a series of independent extension operations to an existing domain over time.

System 100 may include one or more users at one or more user stations 124 that operate the system 100 to access application in domain 104 or the configuration tool 116. User station 124 comprises any type of computing station that may be used to access, operate, or interface with system 100, whether directly or remotely over a network. Examples of such user stations 124 include workstations, personal computers, or remote computing terminals. User station 124 comprises a display device, such as a display monitor, for displaying processing results or data to users at the user station 124. User station 124 also comprises input devices for a user to provide operational control over the activities of some or all of system 100.

Figure 2:
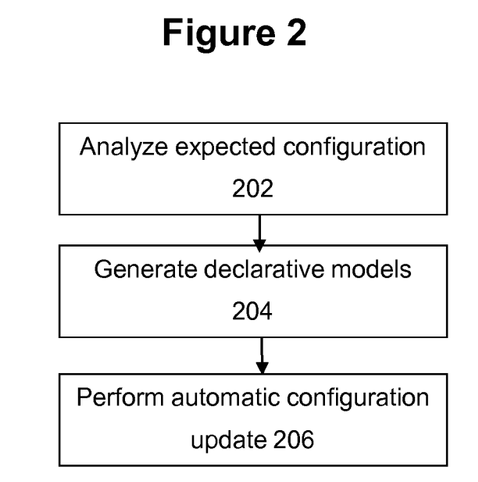
FIG. 2 shows a flowchart of an approach for configuring associations between applications, services, and topology units according to an embodiment of the invention.

FIG. 2 shows a high level flowchart of an approach for configuring associations between applications, services, and topology units for application servers, according to some embodiments of the invention. At 202, the user or developer analyzes the applications and services that will be utilized within the expected domains. Determinations will be made regarding the definitions that will be created for these applications and services. The goal is to group applications and services together such that they can be collectively configured as a group, allowing a much easier process to handle the applications and services.

At 204, declarative models will be generated, where the declarative models relate to the templates for the configuration groups identified from 202. The configuration groups model comprises definitions of applications, services, servers, clusters and mappings that express affinities among these entities. The model enables the ability to define homogeneous sets of applications and services on a single server, group of servers or cluster.

At 206, automated targeting is performed to allow the configuration groups model to enable movement of functionally related applications and services as a single operation when transitioning from one topology to another, e.g. single server to multiple servers or single server to cluster. This simplifies and reduces risk when performing domain configuration.

This approach provides numerous advantages over the prior approaches. Using a declarative model rather than manually scripted model provides greater simplicity for the user, greater flexibility, much better reliability. In addition, this allows the user to abstract application/service producers from application/service consumers, which in turn provides the benefits of allowing application/service consumers to simply refer to higher level application/service groups rather than having to define each individual application and service. Moreover, application/service consumers do not have to change configuration when individual applications/services within a group are changed, as the consumer refers to the higher level group entity. A reference can be implemented to one or more external configuration documents, such as an external document that includes configuration parameters and settings (e.g., java virtual machine settings) applicable to a particular server group.

In addition, the application/service producers are not required to have knowledge of consumers of their applications and services, reducing effort and coordination. The configuration groups also provide a higher level abstraction that can be leveraged in the future for other associative purposes, e.g. initial application and service targeting for new servers added by a customer during a configuration session.

According to one embodiment, the configuration groups model can be externalized from the template described above. This approach permits multiple alternative (or cumulative) configuration groups documents to be employed, which can be selectively chosen by users to perform the domain configuration operations. Consider the alternative situations when users may wish to implement configuration groups according to a small production, medium size product, or a large production environment. To allow these ranges of alternatives, configuration group documents external to the baseline templates may be pre-configured for each of these different sized production environments. The user can then select the configuration groups that are appropriate for the environment size that is suitable for the user.

Figure 3:
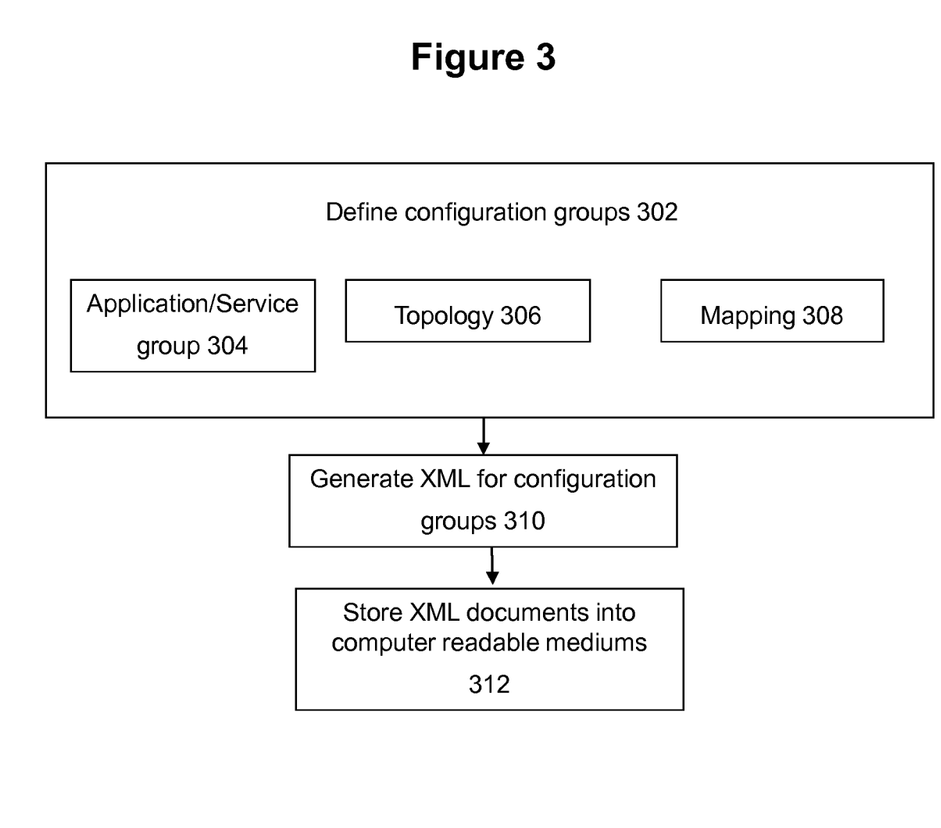
FIG. 3 shows a flowchart of an approach for generating a declarative model to define associations between applications, services, and topology units according to an embodiment of the invention.

FIG. 3 shows a flowchart for generating declarative models according to some embodiments of the invention. Configuration groups are generated at 302, including definitions of application/service groups 304, the domain topology 306, and mappings 308.

The application/service groups 304 definition specifies a set of functionally related applications and services. The applications and services are grouped for deployment together on a particular server or cluster. The application/services group 304 essentially provides a layer of abstraction over the complex applications and services that lie underneath within the domain. This allows unneeded details to be hidden from architects and users when configuring domains, while still allowing the domains and groups to be handled at an appropriate level.

The domain topology 306 generally relates to the parts of the environment that serve as containers to run the applications and services. The domain topology 306 encompasses definitions of servers as well as the targeting of applications and services to a specific server, group of servers or cluster. A "server group" definition specifies a server or servers that can house functionally related sets of applications and services. The definition enables automatic server creation, including specification of multiple server instances. The definition also optionally allows the server group to represent the administrative server. A "cluster group" definition specifies a cluster that can house functionally related sets of applications and services. The definition enables automatic cluster creation. The definition also allows inclusion of server groups, targeted to this cluster.

The application/service group mapping definition 308 specifies targeting of an application/service group to a specific server, group of servers or cluster via the name of the application/service group.

At 310, the configuration groups are embodied as an XML document, which can also be referred to as models. The XML document is stored, at 312, into a computer readable medium.

Figure 4:
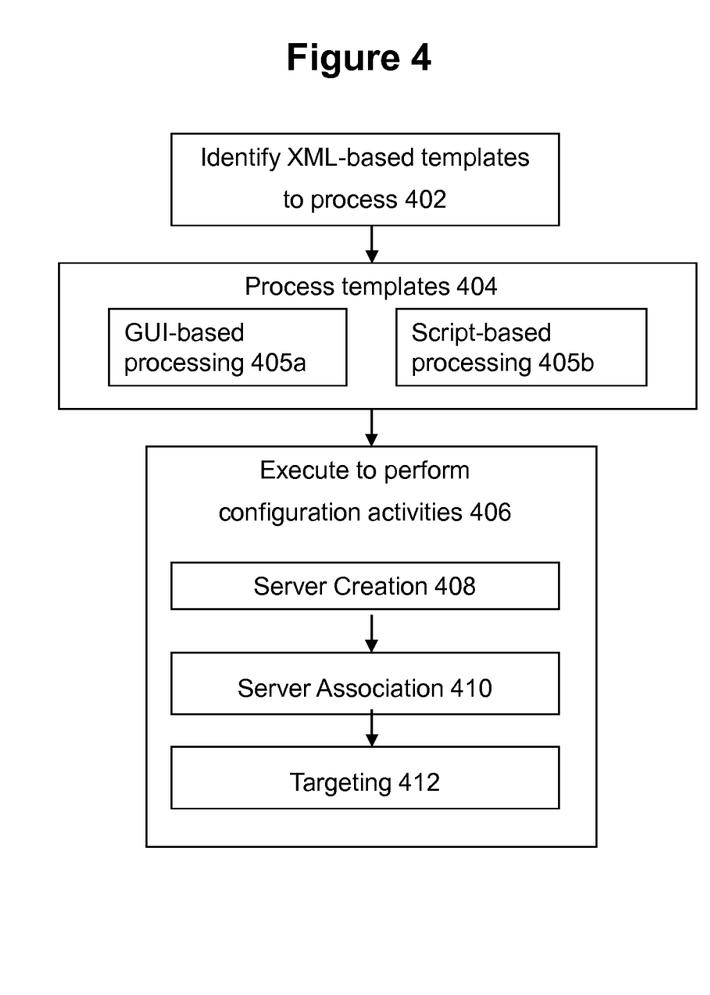
FIG. 4 shows a flowchart of an approach for domain creation or extension according to an embodiment of the invention.

FIG. 4 shows a flowchart of a process for performing domain creation and extension processing according to some embodiments of the invention. At 402, the XML-based templates are identified and/or received to commence the configuration or extension processing. The commencement of the configuration or extension operations may be performed automatically. For example, as changes occur to infrastructure entities during offline configuration processing, the domain's configuration group model is modified to reflect new server or cluster names and remove references to deleted servers and clusters, and the instructions may be automatically generated to process the updated models. This assures accurate targeting. In an alternative embodiment, the instructions are generated manually in response to the user or architect controlling the configuration tool.

At 404, the XML-based templates are processed to perform the configuration activities. In some embodiments, a GUI-based approach 405a may be performed in which a graphical user interface is operated by a user to process the templates to perform the configuration activities. The user operates elements within the GUI framework to initiate and perform the configuration activities. In other embodiments, script-based processing 405b of the templates is performed to configure the system. Scripts are employed in this approach to execute the steps needs for consuming the previously-identified templates to configure the domain. One possible approach for generating scripts from XML is described in U.S. Pat. No. 7,703,005, issued on Apr. 20, 2010, which is hereby incorporated by reference in its entirety. While the approach described in U.S. Pat. No. 7,703,005 describe scripts suitable for consumption within a domain, the described approach can also be applied to generate scripts used to create or extend domains.

At 406, execution commences to perform the configuration or extension activities. Server creation is performed at 408, where a server group definition can be defined in the templates to specify this element, e.g., by specifying a "server-prefix" element to drive automatic server creation. An optional "instances" attribute can be used to enable specification of the number of servers to create. Automatically created servers may be configured to contain default settings, e.g., the "instances" attribute can default to "1".

At 410, server association can be performed. Instead of auto-creating a server, a server can be defined in a template and associated with a server group. In some embodiments, attributes in the template can be matched to achieve this result, e.g., by matching the Server Group's "server-name" attribute to the server name. This enables customization of server attributes.

The administrative server may require special handling. For example, a WebLogic Server domain contains a single administrative server, where the administrative server must be defined in a base domain template and cannot be auto-created. In some embodiments, a server group can associate with the administrative server by valuing a related attribute to obtain the correct result, e.g., by valuing the "admin-server" attribute as "true". This enables loose coupling with the actual name of the administrative server to reduce errors and simplify related definitions. The following provides an example of this approach:

```
<server-group name="MY-ADMIN-SVR" admin-server="true"/>
</server-group>
```

Cluster creation and association may also be performed. The cluster group definition works with clusters in similar fashion to the method by which the server group definition works with servers. The definition includes specification of included server groups, thus composing the members of a cluster. Since a given server can associate with a single cluster, in some embodiments, no option exists to create multiple cluster instances.

At 412, application/service group targeting is performed. This action performs the associations between the applications and services based on the mappings defined in the templates. The present approach allows one to create very specific assignments of applications and services from the definitions provided in the configuration groups definitions. For example, elements in the configuration groups model can be used to enable targeting, e.g., where an "app-svc-group-mapping" element in the definition is used to enable targeting of applications and services to servers and clusters. This element allows specification of a single Application/Service ("app-svc-group" element) mapped to a single Server Group ("target-server-group" element). The domain creation and extension logic persists the configuration groups model, creating or updating the existing model in the domain home.

The application/service targeting may be associated with an order of precedence. The configuration framework executes default targeting, targeting based on template affinities between a server and applications/services and now targeting based on definitions and mappings coded in the configuration groups model. To provide deterministic results, the embodiment will orchestrate processing according to a standard sequence, based on content of the template (s). The targeting logic executes in the following priority order outlined from highest priority to lowest: (1) targeting based on associations in the configuration groups template; (2) targeting based on templates containing servers and applications/services targeted to the included servers; and (3) default auto-targeting for any remaining untargeted applications and services.

Figure 5:
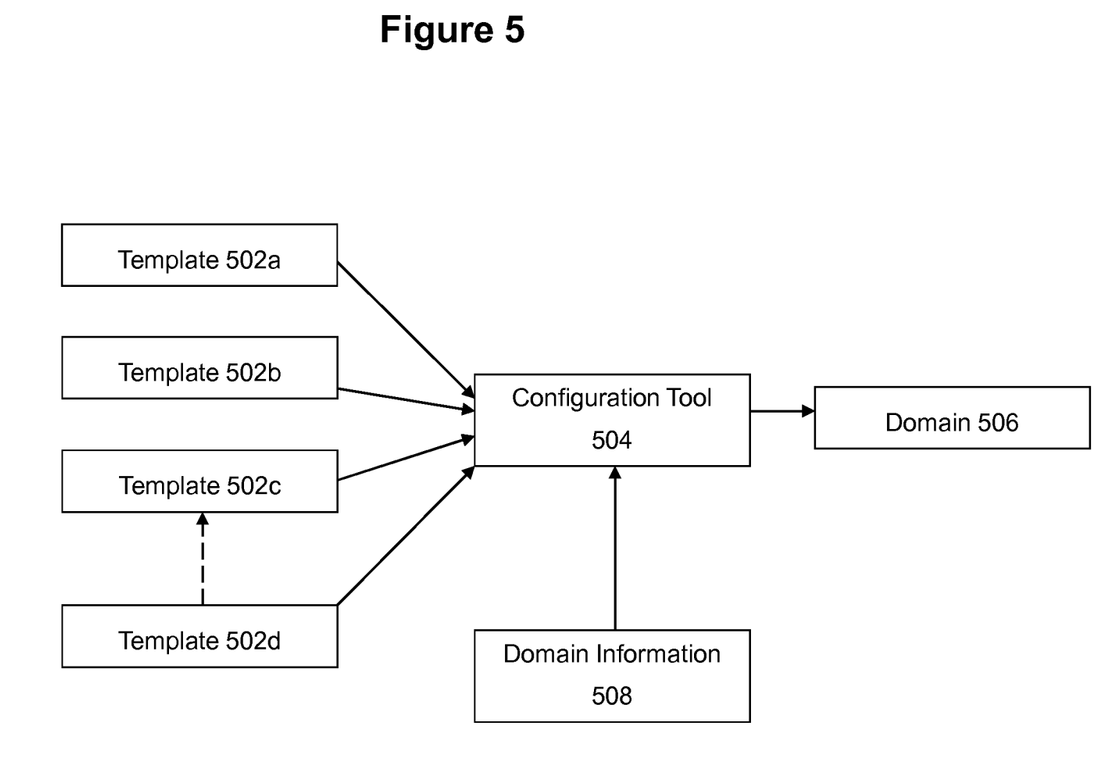
FIG. 5 illustrates that multiple templates can be used to configure a domain.

FIG. 5 illustrates the concept that templates may be created over time, and inter-referenced to perform the domain configuration and extension. Therefore, multiple templates 502a-d may be accessed by a configuration tool 504 to configure the domain 506. One template 502c may even reference another template 502d in a bootstrapped approach to configure a domain. As described and shown in the illustrative examples below and in the figures, this means for example, that a first template may be used to declare/configure a resource, group, or service that is referenced by a second template. Therefore, there may be different levels of dependencies between the templates.

This allows different products teams or organizations to separately create templates and coding that are within their areas of expertise, but allow integration as needed based upon their status as producers or consumers of the resources. Moreover, this approach of using different levels of templates permits easy incremental updates of domain, where changes made in different portions of the domain can be cumulatively taken together over time on an incremental basis from smaller changes made to the individual template.

In addition, the configuration tool 504 may access existing domain information 508 to configure a domain. Such existing domain information 508 may not exist if configuring a new domain. However, when performing extension operations to a domain, the configuration tool 504 may access existing domain information 508 to perform the extension.

Figure 6:
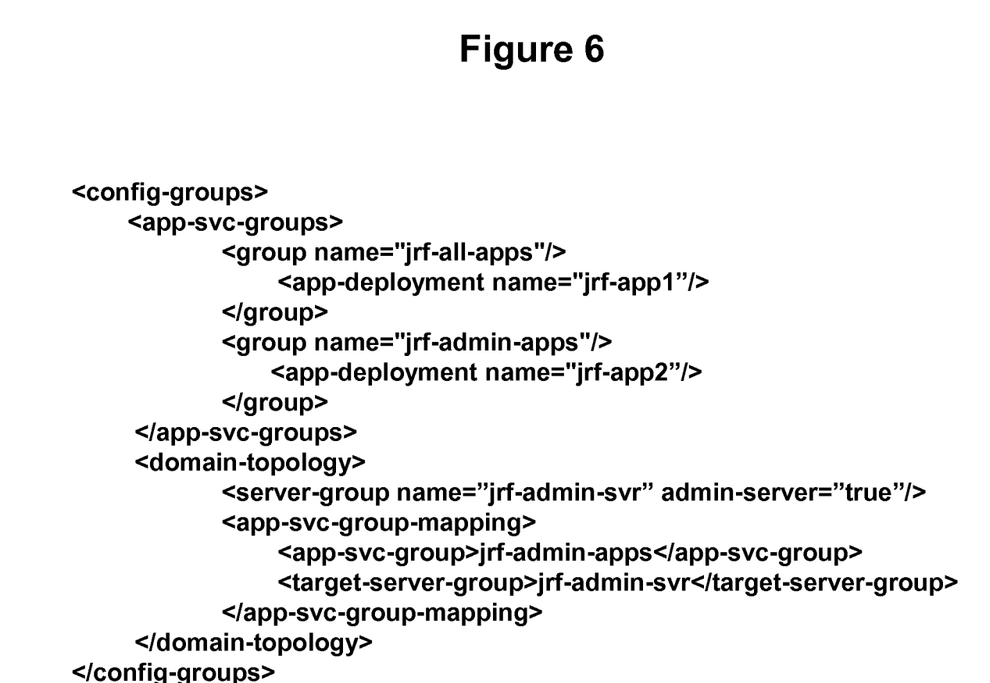
FIGS. 6-8 illustrate example XML for configuring associations between applications, services, and topology units according to an embodiment of the invention.

This document will now present illustrative examples to illustrate the use of configuration groups in a practical context. FIG. 6 shows an example of a JRF ("java required files") template, where the JRF template contains two application/service groups ("jrf-all-apps" and "jrf-admin-apps"), one holding applications and services intended to deploy only on the administrative server, with another group intended to deploy on several potential servers dedicated for use by upper level components.

The configuration group file in the template defines one server group representing the administrative server ("jrf-admin-svr"). The file also defines an application/service group containing applications and services intended for deployment solely on the administrative server. The "admin-server=true" element indicates that a new server is not really being defined, but rather it already exists and that targeting is occurring to an existing server.

These two entities associate together via an application/service group mapping ("app-svc-group-mapping" element) that links the application/service group to the server group, and thereby to the administrative server.

The configuration group file defines another application/service group for JRF applications and service intended to run on other clusters and servers, as defined by upper level components. No server group or application/service group mapping exists within the JRF template for this application/service group. Upper level templates should define server groups and application/service group mappings that target this JRF application/service group. This demonstrates a fundamental principle applicable to configuration groups in which loose coupling between templates defining common applications/services and templates defining servers and clusters that house these applications and services. Lower level components should not require foreknowledge of all potential consumers. Rather, upper level components should define server groups as required and associate these groups with lower level application/service groups.

Figure 7:
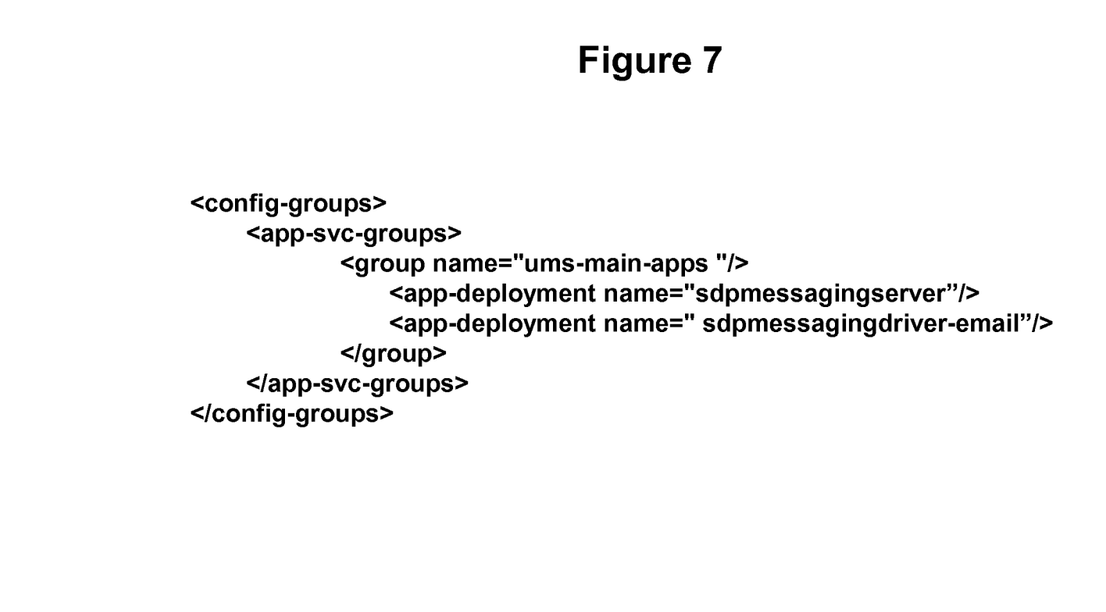

Referring to FIG. 7, shown is an example of a UMS ("unified messaging system") template, which contains a single application/service group holding applications and services intended to run on other clusters and servers, as defined by upper level components, similar to the non-administrative JRF group.

The configuration groups definition in FIG. 7 contains no server groups, keeping the UMS template free of affinities to upper level components for the same reasons articulated in the previous discussion of the JRF template. Instead, the UMS template only references an application/service group ("ums-main-apps"), which includes deployment names that can be later accessed by a higher level template.

Like the JRF template, the UMS template generally relates to lower level producers of resources used by other consumers, such as a higher level messaging system like SOA ("Service Oriented Architecture"). To avoid requiring the SOA template (FIG. 8) to have to define these lower level details, those details would be stated in the UMS and JRF templates and referenced later by the SOA template.

Figure 8:
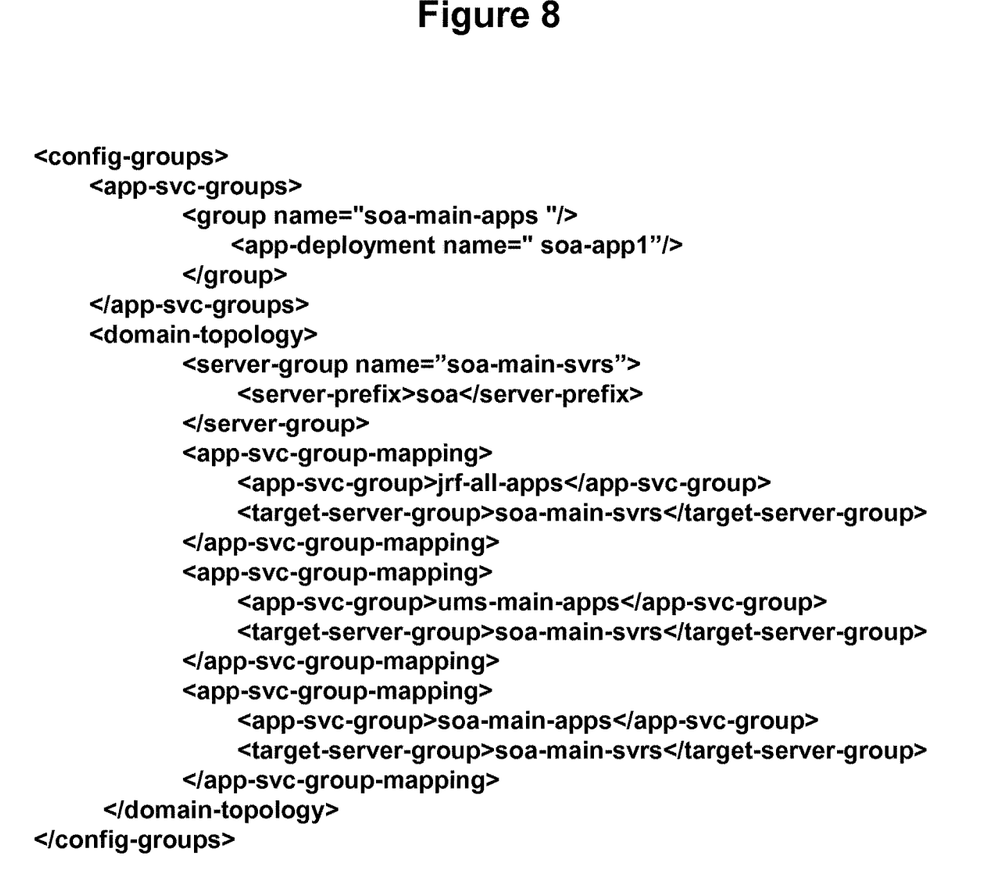

FIG. 8 shows an example of a SOA template, which is the higher level consumer template that will access the previous definitions made by the JRF and UMS templates. The SOA template contains one application/service group ("SOA-main-apps") with applications and services intended to run solely on SOA clusters and servers. A server group is defined for the SOA server, specifying creation of a single managed server to run the SOA software stack. The definition includes specification of a prefix to uniquely qualify the new server name.

An application/service group mapping ties the JRF and UMS common applications and services to the SOA server along with SOA-specific applications and services. For example, the "ums-main-apps" application/service group is mapped to the "soa-main-svrs" server group. The "jrf-all-apps" application/service group is mapped to the "soa-main-svrs" server group. In addition, the "soa-main-apps" application/service group is mapped to the "soa-main-svrs" server group.

This template is used to create very specific targeting of the applications, services, and servers. During targeting, these mapping are implemented to automatically define the domain associated with these components. Such targeting may occur, for example, during the boot-up process associated with these domain elements.

Therefore, what has been described is a vastly improved approach for using configuration groups to configure domains for application servers. This approach provides numerous advantages over the prior approaches by allowing users or architects to abstract application/service producers from application/service consumers, which in turn provides the benefits of allowing application/service consumers to simply refer to higher level application/service groups rather than having to define each individual application and service. Moreover, application/service consumers do not have to change configuration when individual applications/services within a group are changed, as the consumer refers to the higher level group entity. Using a declarative model rather than manually scripted model provides greater simplicity for the user, greater flexibility, and much better reliability.

System Architecture Overview

Figure 9:
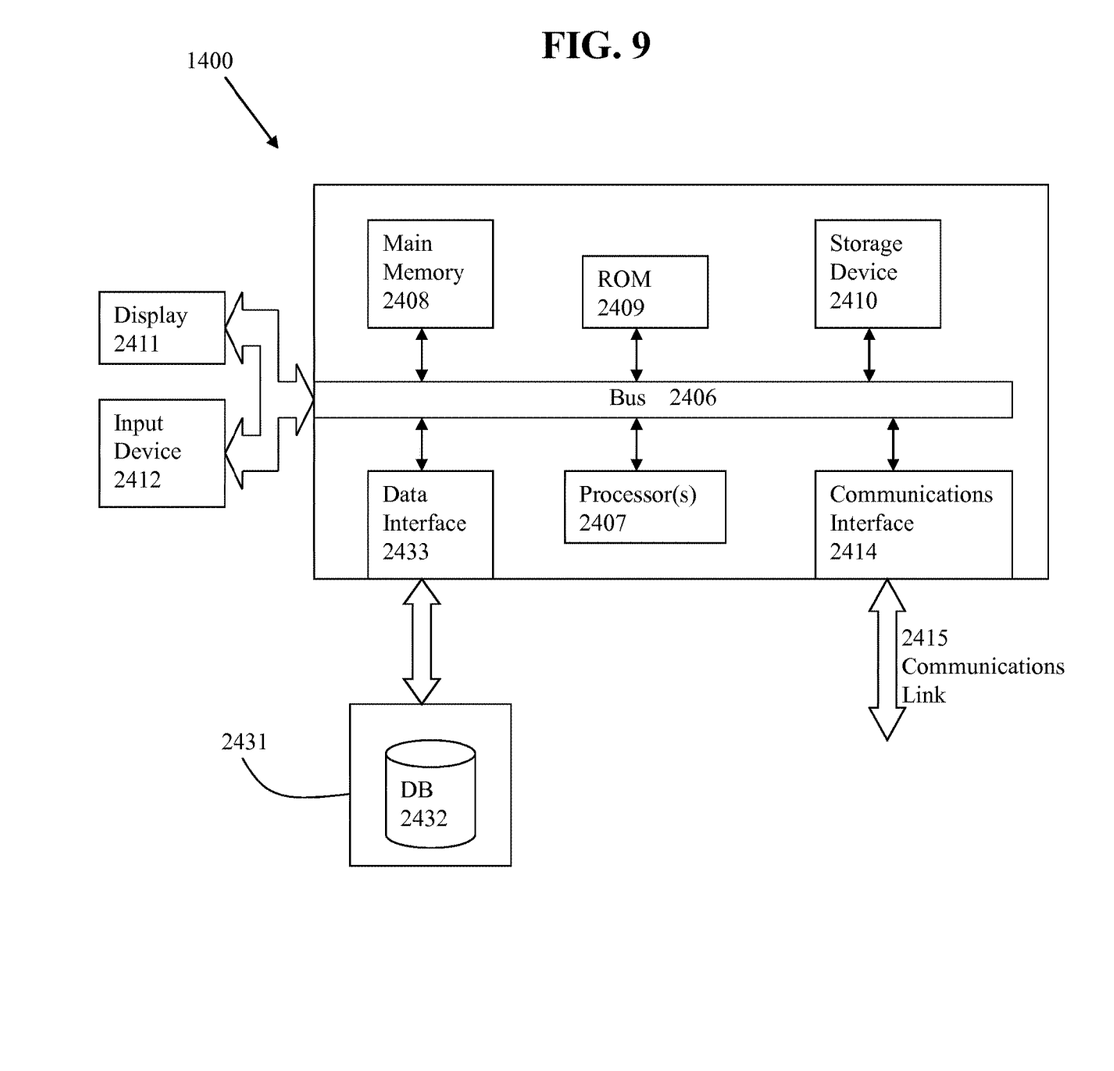
FIG. 9 depicts a computerized system on which a method for re-using digital assertions in a mixed signal context can be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for configuring a domain relating to an application server with a processor, comprising:
   analyzing expected applications to be utilized for the domain;
   identifying declarative models for the domain, wherein the declarative models comprise configuration groups for the domain, wherein the configuration groups comprise application groups that define sets of two or more applications from the expected applications to be managed collectively as a group, topology groups, and mappings that map the topology groups to the application groups, wherein the application groups include a set of two or more applications grouped for deployment together as a higher level abstraction during configuration of the domain;
   performing targeting for the domain using the declarative models;
   detecting a change to at least one infrastructure entity associated with at least one declarative model of the declarative models, wherein the change to the at least one infrastructure entity comprises at least one of: a new infrastructure entity and a removed infrastructure entity;
   modifying the at least one declarative model based on the change, to obtain at least one modified declarative model; and
   performing targeting for the domain using the at least one modified declarative model.

2. The method of claim 1 in which the configuration groups are embodied in one or more templates.

3. The method of claim 1 in which the topology groups comprise servers or cluster.

4. The method of claim 1 in which the expected applications are associated with services that comprise resources that are used by the expected applications.

5. The method of claim 1 in which the declarative models are embodied as one or more XML-based documents or models.

6. The method of claim 1 in which the domain comprises a basic administration unit comprising at least one server instance.

7. The method of claim 1 in which the targeting is performed using one or more scripts.

8. The method of claim 1 in which the domain is extended.

9. The method of claim 1, wherein targeting is performed according to a deterministic sequence, the deterministic sequence comprising a plurality of targeting operations in a defined order of priority.

10. The method of claim 9, wherein the plurality of targeting operations comprises at least: targeting based on configuration group mappings; targeting based on mappings of particular servers to particular software components; and default targeting for untargeted software components.

11. The method of claim 10, wherein default targeting for untargeted software components has lowest priority among the plurality of targeting operations.

12. The method of claim 1, wherein the change to the at least one infrastructure entity comprises one or more of: a new server; a new cluster; a new server group; a deleted server; a deleted server group; and a deleted cluster.

13. The method of claim 1, wherein the at least one infrastructure entity comprises one or more of: a server; a server group; and a cluster.

14. A computer program product embodied on a non-transitory computer readable medium, the non-transitory computer readable medium having stored thereon a sequence of instructions which, when executed by a processor causes the processor to execute a method for configuring a domain relating to an application server, the method comprising:
   analyzing expected applications to be utilized for the domain;
   identifying declarative models for the domain, wherein the declarative models comprise configuration groups for the domain, wherein the configuration groups comprise application groups that define sets of two or more applications from the expected applications to be managed collectively as a group, topology groups, and mappings that map the topology groups to the application groups, wherein the application groups include a set of two or more applications grouped for deployment together as a higher level abstraction during configuration of the domain;
   performing targeting for the domain using the declarative models;
   detecting a change to at least one infrastructure entity associated with at least one declarative model of the declarative models, wherein the change to the at least one infrastructure entity comprises at least one of: a new infrastructure entity and a removed infrastructure entity;
   modifying the at least one declarative model based on the change, to obtain at least one modified declarative model; and
   performing targeting for the domain using the at least one modified declarative model.

15. The computer program product of claim 14 in which the configuration groups are embodied in one or more templates.

16. The computer program product of claim 14 in which the topology groups comprise servers or cluster.

17. The computer program product of claim 14 in which the expected applications are associated with services that comprise resources that are used by the expected applications.

18. The computer program product of claim 14 in which the declarative models are embodied as XML-based documents or models.

19. The computer program product of claim 14 in which the domain comprises a basic administration unit comprising at least one server instance.

20. The computer program product of claim 14 in which the targeting is performed using one or more scripts.

21. A computer-based system for configuring a domain relating to an application server, comprising:

a computer processor to execute a set of program code instructions; and a memory to hold the program code instructions, in which the program code instructions comprises program code to perform operations comprising:

analyzing expected applications to be utilized for the domain;

identifying declarative models for the domain, wherein the declarative models comprise configuration groups for the domain, wherein the configuration groups comprise application groups that define sets of two or more applications from the expected applications to be managed collectively as a group, topology groups, and mappings that map the topology groups to the application groups, wherein the application groups include a set of two or more applications grouped for deployment together as a higher level abstraction during configuration of the domain;

performing targeting for the domain using the declarative models;

detecting a change to at least one infrastructure entity associated with at least one declarative model of the declarative models, wherein the chance to the at least one infrastructure entity comprises at least one of: a new infrastructure entity and a removed infrastructure entity;

modifying the at least one declarative model based on the change, to obtain at least one modified declarative model; and performing targeting for the domain using the at least one modified declarative model.

22. The computer-based system of claim 21 in which the configuration groups are embodied in one or more templates.

23. The computer-based system of claim 21 in which the topology groups comprise at least one of: servers and clusters.

24. The computer-based system of claim 21 in which the expected applications are associated with services that comprise resources that are used by the expected applications.

25. The computer-based system of claim 21 in which the declarative models are embodied as XML-based documents or models.

26. The computer-based system of claim 21 in which the domain comprises a basic administration unit comprising at least one server instance.

27. The computer-based system of claim 21 in which the targeting is performed using one or more scripts.

28. The computer-based system of claim 21 in which the domain is extended.

* * * * *

UNITED STATES PATENT AND TRADEMARK OFFICE
CERTIFICATE OF CORRECTION

PATENT NO.         : 10,073,706 B2
APPLICATION NO.    : 12/824004
DATED              : September 11, 2018
INVENTOR(S)        : Felts Page 1 of 1

It is certified that error appears in the above-identified patent and that said Letters Patent is hereby corrected as shown below:

In the Specification

In Column 3, Line 4, delete "aplications" and insert -- applications --, therefor.

In the Claims

In Column 13, Line 23, in Claim 21, delete "chance" and insert -- change --, therefor.

Signed and Sealed this
Ninth Day of July, 2019

Andrei Iancu
*Director of the United States Patent and Trademark Office*